(12) United States Patent
Singh et al.

(10) Patent No.: US 11,078,090 B2
(45) Date of Patent: Aug. 3, 2021

(54) MANIFOLD FOR DOMESTIC WATER PURIFIER SYSTEM WITH SPECIFIC CARTRIDGE REPLACEMENT

(71) Applicant: Marmon Water (Singapore) Pte. Ltd., Singapore (SG)

(72) Inventors: Vivek Kunwar Narendra Singh, Mahal Nagpur (IN); Sathyanarayana Jujaray, Bangalore (IN); Rajesh K N, Chikkaballapur (IN); Narendra Pratap Singh, Praddesh (IN)

(73) Assignee: Marmon Water (Singapore) PTE. LTD., Singapore (SG)

( * ) Notice: Subject to any disclaimer, the term of this patent is extended or adjusted under 35 U.S.C. 154(b) by 0 days.

(21) Appl. No.: 16/804,166

(22) Filed: Feb. 28, 2020

(65) Prior Publication Data

US 2020/0247686 A1 Aug. 6, 2020

Related U.S. Application Data

(63) Continuation-in-part of application No. 16/255,314, filed on Jan. 23, 2019, now Pat. No. 10,913,017.

(60) Provisional application No. 62/639,564, filed on Mar. 7, 2018.

(30) Foreign Application Priority Data

Jan. 10, 2020 (IN) .............................. 202023001203

(51) Int. Cl.
*C02F 1/00* (2006.01)
*C02F 1/44* (2006.01)
*C02F 1/32* (2006.01)
*C02F 1/28* (2006.01)

(52) U.S. Cl.
CPC .............. *C02F 1/001* (2013.01); *C02F 1/283* (2013.01); *C02F 1/32* (2013.01); *C02F 1/441* (2013.01); *C02F 2001/007* (2013.01); *C02F 2201/005* (2013.01); *C02F 2201/006* (2013.01); *C02F 2209/005* (2013.01); *C02F 2301/04* (2013.01)

(58) Field of Classification Search
None
See application file for complete search history.

(56) References Cited

U.S. PATENT DOCUMENTS

| 5,143,601 | A  | 9/1992  | Slovak et al.      |
|-----------|----|---------|--------------------|
| 6,533,926 | B2 | 3/2003  | Hawkins            |
| 6,537,444 | B2 | 3/2003  | Wilberscheid et al.|
| 6,551,503 | B2 | 4/2003  | Niers et al.       |
| 6,773,588 | B2 | 6/2004  | Beeman et al.      |
| 7,294,262 | B2 | 11/2007 | Tadlock            |

(Continued)

*Primary Examiner* — Richard C Gurtowski
(74) *Attorney, Agent, or Firm* — DeLio Peterson & Curcio LLC; Todd A. Bayne, Jr.

(57) ABSTRACT

A manifold for domestic water purification systems having flow paths that can be redirected without having to change the physical structure of the manifold or water purification system—a structure to assist with proper installation and stabilization of specific filter cartridges, a memory reader for processing data relating to the state of the filter cartridges, a hinge system to allow for easier installation/removal of new and replacement filter cartridges, and a flow path structure to assist in adding accessories to the water filtration system without requiring a modification to the manifold structure.

21 Claims, 13 Drawing Sheets

(56) References Cited

U.S. PATENT DOCUMENTS

| | | | |
|---|---|---|---|
| 7,513,996 B2 | 4/2009 | Kloos et al. | |
| 7,918,998 B2 | 4/2011 | Tsai | |
| 8,242,893 B1 | 8/2012 | Lin | |
| 8,449,770 B2 | 5/2013 | Lin | |
| 8,945,383 B2 | 2/2015 | Sherman et al. | |
| 9,688,546 B2 | 6/2017 | Froelicher et al. | |
| 2006/0060512 A1* | 3/2006 | Astle | B01D 29/606 210/85 |
| 2008/0185323 A1 | 8/2008 | Kargenian | |
| 2010/0292844 A1 | 11/2010 | Wolf | |
| 2013/0240431 A1 | 9/2013 | Foix et al. | |
| 2016/0144301 A1 | 5/2016 | Tadlock | |
| 2017/0259196 A1 | 9/2017 | Foix | |

* cited by examiner

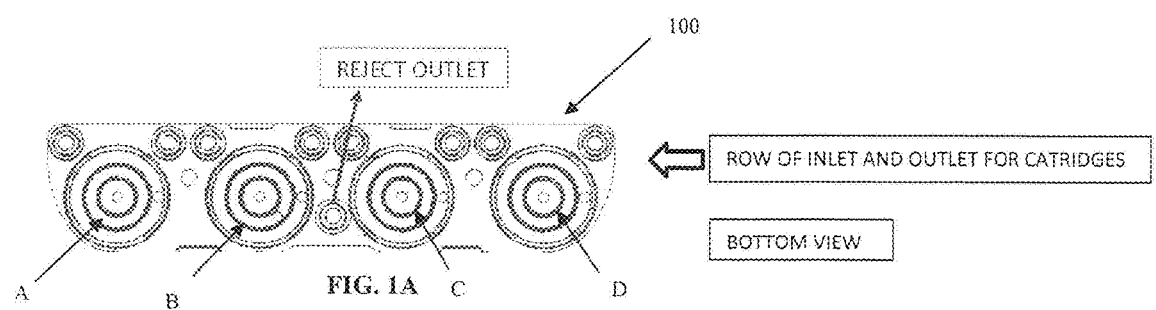
FIG. 1A
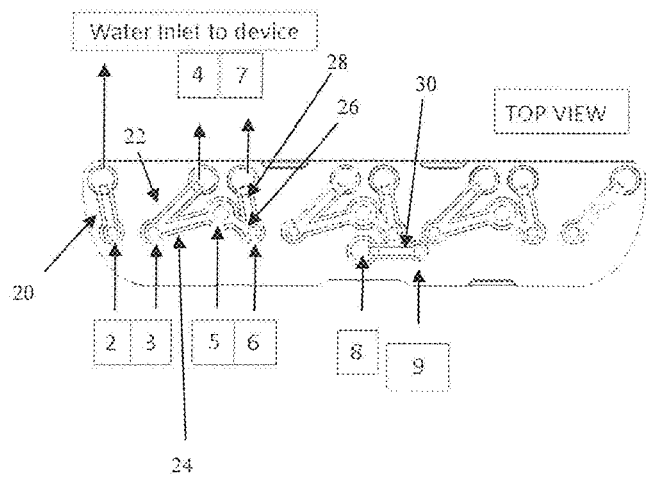
FIG. 1B
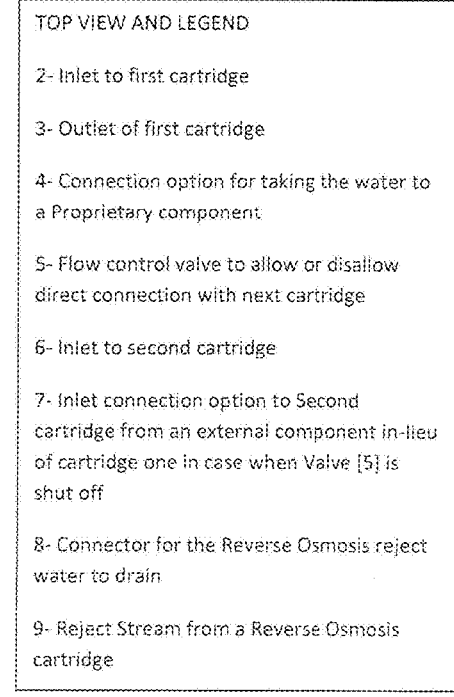

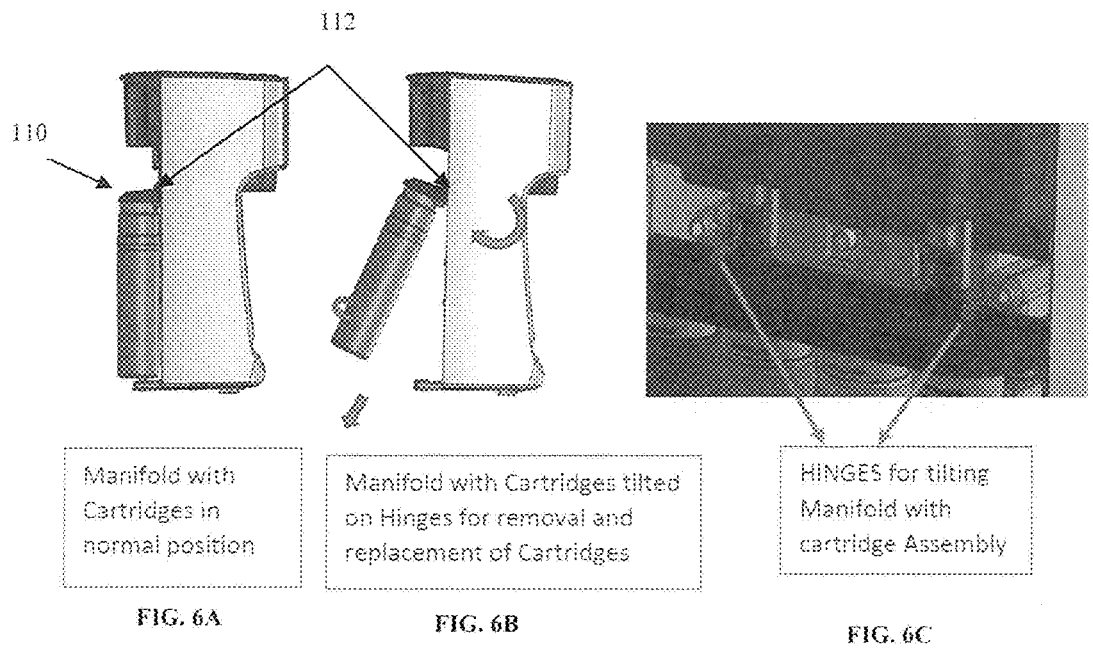
FIG. 6A — Manifold with Cartridges in normal position
FIG. 6B — Manifold with Cartridges tilted on Hinges for removal and replacement of Cartridges
FIG. 6C — HINGES for tilting Manifold with cartridge Assembly
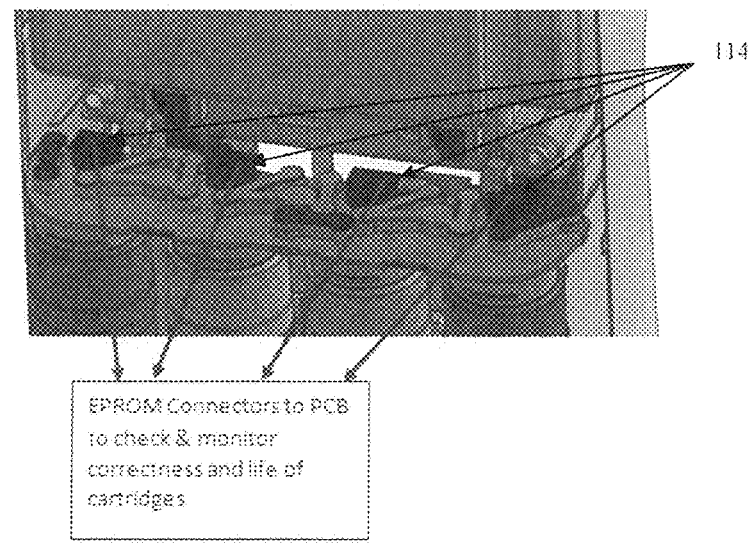
EPROM Connectors to PCB to check & monitor correctness and life of cartridges
FIG. 7

US 11,078,090 B2

MANIFOLD FOR DOMESTIC WATER PURIFIER SYSTEM WITH SPECIFIC CARTRIDGE REPLACEMENT

BACKGROUND OF THE INVENTION

1. Field of the Invention

The present invention relates in general to a manifold for domestic water purification systems, and more specifically to a manifold having flow paths that can be redirected without having to change the physical structure of the manifold or water purification system—a structure to assist with proper installation of specific filter cartridges, a memory reader for processing data relating to the state of the filter cartridges, and a hinge system to allow for easier installation/removal of new and replacement filter cartridges.

2. Description of Related Art

There remains a demand in industry and in commercial and domestic settings for filter systems that can be used in diverse applications, and which can be assembled to achieve specific and specialized filtration needs. It is desirable for such filter systems to be adaptable for various filtering needs and filtering capacity. Furthermore, a filter system will generally require the application of different filtration units, which necessitates redirecting fluid flow.

Manifolds for domestic water purification systems are meant to secure filter cartridges in place after they are installed into their respective water purification device. These manifolds allow raw water to flow into and through the installed filter cartridge to ensure proper purification and filtration occurs. The structures of these manifolds tend to be ordinary in nature—they accept many variations of the filter cartridges they are intended to receive, and they do not provide end users with much guidance as to proper installation, or, in cases involving more than one cartridge, the correct order to install specific cartridges having separate functions. Furthermore, these manifolds do not possess the ability to redirect the flow of water to outside attachments that would otherwise be desirable without first necessitating some change to the physical structure of the manifold.

U.S. Patent Publication No. 2004/0104157 was published to Beeman, et al., on Jun. 3, 2004, titled "PURIFIED WATER SUPPLY SYSTEM." This publication is related to U.S. Pat. No. 6,773,588, issued to Beeman, et al., on Aug. 10, 2004. It teaches a system for providing purified water having a plurality of individual modules, each of which includes a separable head and a canister, which modules are joined one to another via these heads to create a composite manifold.

U.S. Patent Publication No. 2010/0292844 was published to Wolf on Nov. 18, 2010, titled "SELF-CONTAINED PORTABLE MULTI-MODE WATER TREATMENT SYSTEM AND METHODS." It teaches an automated water treatment system for treating raw water to produce potable water. The system has several selectable treatment subsystems and a controller which automatically selects and controls the mode of operation from a transient, normal, or backwashing mode, automatically controls the flow of water through a treatment path based upon the selected mode of operation and the measured water quality characteristics of the water at selected locations, automatically determines, based upon the selected mode of operation and the water quality parameter measurements, which of the plurality of the selectable subsystems is needed to produce potable water at the output; and automatically directs the flow of water through a treatment path through the system to bypass the water treatment subsystems and elements that are not needed to produce potable water.

It is noted that the filter removal and replacement process often requires significantly more attention and work when the filtration system uses different types of filters for filtering different substances from the fluid or the fluids. Moreover, the attachment of additional components becomes cumbersome, if not impossible, without easy access to the attachment structure on the manifold, as well as the redirection of flow to accommodate the additional components. Thus, a filtration system, and more specifically, a manifold, that can readily accommodate the replacement of filtration devices, as well as the redirection of fluid flow, is desirable.

SUMMARY OF THE INVENTION

Bearing in mind the problems and deficiencies of the prior art, it is therefore an object of the present invention to provide a manifold capable of being swung out of its structure to allow for convenient insertion of replacement parts.

It is another object of the present invention to provide a manifold that allows for multiple flow paths of raw water in the water purification device so that different accessories, components, and/or child parts may be used to achieve the proper water purification option without necessitating any change in the overall layout of the original purification structure.

A further object of the invention is to provide a manifold that can hold several cartridges at a time with receptacles having specific structural limitations to distinguish individual cartridges having complimentary structural limitations that allow for insertion into specific assigned locations on the manifold.

It is yet another object of the present invention to provide a manifold designed to permit terminals of an embedded electronic component on a filter cartridge to mate with corresponding terminals in the manifold itself, the manifold terminals permitting the electronic component to electronically communicate with, identify, and verify the suitability of an inserted filter cartridge.

Still other objects and advantages of the invention will in part be obvious and will in part be apparent from the specification.

The present invention is directed to, in a first aspect, a water purification system, comprising: a plurality of filter cartridges; a manifold attachable to a base, the manifold having a top surface and a bottom surface, the bottom surface having mating structures for receiving the plurality of filter cartridges, the manifold forming a rotatable shelf including hinges for engaging the base, wherein the rotatable shelf is rotatable relative to the base to rotate the plurality of filter cartridges with respect to the base to facilitate extraction and insertion of each of the plurality of filter cartridges; and a plurality of flow path structures integral with and disposed on the top surface of the manifold forming channels for water to flow between the filter cartridges, the plurality of flow path structures having at least one inlet for water ingress and one outlet for water egress for each of the plurality of filter cartridges, the flow path structures having separate extensions or channel formations for receiving at least one valve for allowing or prohibiting a direct flow of water between at least two filter cartridges, or for redirecting flow to components other than the plurality of filter cartridges.

The components other than the plurality of filter cartridges include solenoid valves, pumps, ultra-violet purifiers, ultra-filtration structures, TDS sensors, low pressure switches, and/or proprietary filters.

In a second aspect, the present invention is directed to a water purification system, comprising: a plurality of filter cartridges; a manifold having a base structure, a rotatable shelf, and a memory device reader mounted on or within the manifold, the shelf having a top surface and a bottom surface, the bottom surface having mating structures for receiving the filter cartridge; a memory device mounted on or within the filter cartridge attached to the manifold, the memory device in electrical communication with the memory device reader mounted on or within the manifold; wherein the memory device is read by the memory device reader, the memory device reader transmitting information relating to the useable life and proper/improper installation of the filter cartridge.

A plurality of memory devices may be mounted on or within a plurality of filter cartridges in electrical communication with an equal number of corresponding memory device readers mounted on or within the manifold.

The manifold includes a plurality of flow path structures integral with and disposed on the top surface forming channels for water to flow between the filter cartridges, the plurality of flow path structures having at least one inlet for water ingress and one outlet for water egress for each of the plurality of filter cartridges, the flow path structures having separate extensions or channel formations for receiving at least one valve for allowing or prohibiting a direct flow of water between at least two filter cartridges.

In a third aspect, the present invention is directed to a manifold for a water purification system, comprising: a rotatable shelf about a stationary base, the rotatable shelf having a top surface and bottom surface, the bottom surface having receptacles for receiving filter cartridges, each receptacle having a distinct structural limitation for mating with one of the filter cartridges, the filter cartridges having a complementary distinct structural limitation for mating with the complementary distinct structural limitation on the manifold, such that only one type of filter cartridge is allowed to fit into a specific receptacle on the bottom surface of the shelf.

The filter cartridges are defined having a longitudinal axis, and wherein the shelf is rotatable relative to the base structure to rotate the filter cartridges about their longitudinal axis to expose the shelf bottom surface receptacles for quick installation or removal of the filter cartridges.

In a fourth aspect, the present invention is directed to a water purification system, comprising: a manifold including a base structure having a top surface and a bottom surface, the bottom surface having mating structures for receiving a plurality of filter cartridges, the manifold forming a rotatable shelf including hinges for engaging a supporting base, wherein the shelf is rotatable relative to the supporting base to rotate the plurality of filter cartridges to facilitate extraction and insertion of each of the plurality of filter cartridges; a plurality of flow path structures integral with and disposed on the top surface of the manifold forming channels for water to flow between the filter cartridges, the plurality of flow path structures having at least one inlet for water ingress and one outlet for water egress for each of the plurality of filter cartridges, the flow path structures having separate extensions or channel formations for receiving a plug to stop flow, a valve for redirecting flow between at least two filter cartridges or between a filter cartridge and at least one accessory component; wherein opening of the valve allows for a direct flow of water, and wherein closing of the valve prohibits a direct flow of water.

In a fifth aspect, the present invention is directed to a method of installing or removing filter cartridges within a water filtration system comprising: providing a plurality of filter cartridge housings, each having a memory device mounted on or within each filter cartridge housing; providing a base structure, a manifold in rotatable communication with the base structure, and a memory device reader mounted on or within the manifold, the manifold having a top surface and a bottom surface, the bottom surface having mating structures for receiving the plurality of filter cartridges; providing at least one flow path structure disposed on the top surface of the manifold forming at least one channel for water to flow between the filter cartridges, the flow path structure having at least one inlet for water ingress and one outlet for water egress, and a valve capable of being opened or closed for allowing or prohibiting a direct flow of water between the filter cartridges; rotating the manifold about the base structure such that the mating structures on the bottom surface of the manifold are exposed to receive the filter cartridges; attaching or removing the filter cartridges to or from the manifold mating structures; if attaching the filter cartridges, identifying the filter cartridges received in the bottom surface mating structures through interaction of the filter cartridge memory devices with the manifold memory device readers; allowing for water ingress to traverse through the at least one channel; and transmitting information, by the memory reader, relative to the useable life and proper/improper installation of the filter cartridges; if removing the filter cartridges, activating a water shut off mechanism upon removal of the filter cartridges from the manifold such that water flow from the manifold mating structures is stopped.

In a sixth aspect, the present invention is directed to a method of adding at least one accessory in flow communication with at least one filter cartridge in a water filtration system: providing a filter base structure and a manifold in rotatable communication with the filter base structure, the manifold having a top surface and a bottom surface, the bottom surface having mating structures for receiving the at least one filter cartridge; providing flow path structures disposed on the top surface of the manifold forming channels for water to flow to and from the at least one filter cartridge, the flow path structures forming at least one inlet for water ingress and at least one outlet for water egress, and a plurality flow path structure segments for receiving water directing components including valves and/or plugs, the valves capable of being opened or closed for allowing or prohibiting a direct flow of water; rotating the manifold about the base structure such that the mating structures on the bottom surface of the manifold are exposed to receive the at least one filter cartridge; attaching the at least one filter cartridge to a corresponding manifold mating structure; placing a plug and/or valve in the flow path structures on the manifold top surface to redirect water from the manifold to a connecting flow structure to the accessory and to receive water from a returning connecting flow structure of the accessory to the manifold; and forming the flow path structures to allow for water ingress to traverse through the at least one inlet for water ingress to the flow path structures, to the at least one filter cartridge, to the accessory, and to exit the at least one outlet for water egress.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 1A-1B depicts top and bottom views of a preferred embodiment of an embodiment of the manifold of the present invention. FIG. 1A depicts a bottom view of the manifold, showing four interconnection structures A-D for attaching four filter cartridges (not shown), and FIG. 1B depicts a top-side view of the manifold;

FIGS. 6A-6C depict a manifold as a rotatable shelf structure with hinges on its back side (facing towards the water purification system) to assist with quick installation and removal of the filter cartridges. FIG. 6A depicts the manifold with cartridges in a normal, operational position. FIG. 6B depicts the manifold with cartridges tilted on hinges for removal and replacement. FIG. 6C depicts the hinges on the rotatable manifold shelf structure;

FIG. 7 depicts a manifold capable of utilizing erasable programmable read-only memory chip connectors, which are connected to a Printed Circuit Board ("PCB") to retrieve and monitor data regarding each specific cartridge installed in the manifold;

DESCRIPTION OF THE EMBODIMENT(S)

Figure 2:
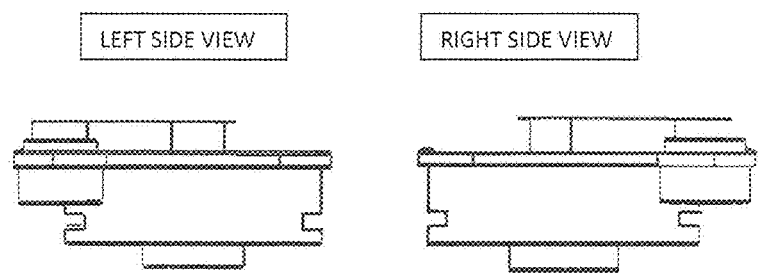
FIG. 2 depicts left and right side views of the manifold of FIGS. 1A-1B.

In describing the embodiment(s) of the present invention, reference will be made herein to FIGS. 1-17 of the drawings in which like numerals refer to like features of the invention.

FIGS. 1A-1B depicts top and bottom views of a preferred embodiment of the manifold 100 of the present invention. Manifold 100 comprises a base and rotatable shelf which can hold a plurality of different cartridges at a time, allowing water to pass through multiple desirable paths without the need to physically alter the manifold base or water purification device. A four-cartridge system is exemplified in the drawings, though other embodiments of the present invention may be employed to support more or less cartridges. FIG. 1A depicts a bottom view of manifold 100, showing four interconnection structures A-D for attaching four filter cartridges (not shown). A reject outlet is depicted for the situation where a reverse osmosis filter cartridge is one of the four filter cartridges in the manifold. A row of inlets and outlets are depicted. The size of inlets and outlets may vary for fluid flow conditions.

FIG. 1B depicts a top-side view of manifold 100. The fluid flow ports and channels are shown. Inlet 2 represents fluid flow into a first cartridge from the inlet to the device. Channel 20 provides a fluid flow path from the inlet to the manifold to inlet 2, which is the input to the first cartridge. The first cartridge receives inlet fluid flow from inlet 2 and outputs filtered fluid from outlet 3. Channel 22 provides a fluid flow path from output 3 of the first filter cartridge to connection interface 4, which is a connection for an optional component that may be attached to manifold 100. A flow control valve 5 is introduced to allow or disallow direct connection to the next filter cartridge. Channel 24 directs fluid from outlet 3 to flow control valve 5. Flow control valve 5 has the option of letting fluid flow to the input 6 of the second filter cartridge via channel 26. Fluid flow channel 28 redirects fluid to an inlet connection 7 for an optional external component in lieu of a cartridge in the event flow control valve 5 shuts off. Connector 8 depicts a connection for a reverse osmosis cartridge. This is the Reject Outlet for sending fluid to drain. Connector 8 receives a reject stream of fluid through channel 30 from the output 9 of a reverse osmosis cartridge.

The flow channels between the cartridges present separate extensions or formations for receiving at least one valve for allowing or prohibiting a direct flow of water between any two filter cartridges.

Figure 3A:
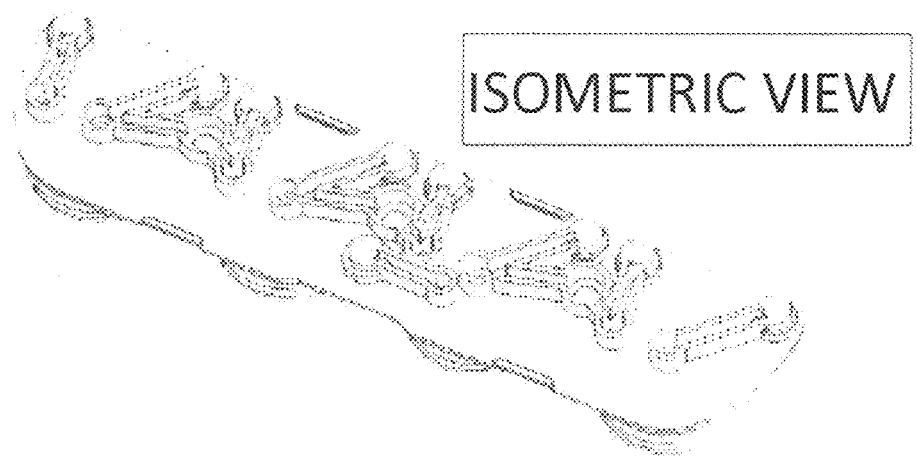
FIG. 3A is an isometric topside view of the manifold of FIGS. 1A-1B, showing the various fluid flow paths for connection not only to the filter cartridges, but to optional components as well.
Figure 3B:
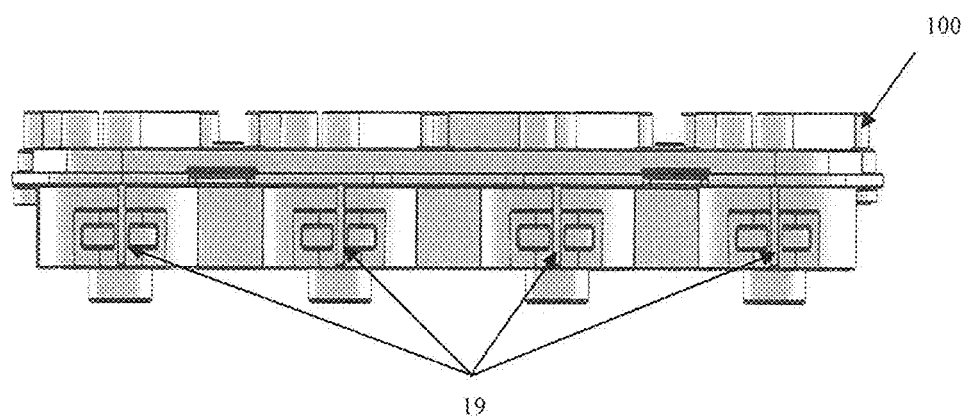
FIG. 3B depicts ribs formed on the manifold structure to strengthen the cartridge holding socket.

FIG. 2 depicts left and right side views of manifold 100. FIG. 3A is an isometric topside view of manifold 100, showing the various fluid flow paths for connection not only to the filter cartridges, but to optional components as well. In order to work under higher pressure conditions, additional features such as ribs 19 may be included in the cartridge holding socket. FIG. 3B depicts ribs 19 formed on the manifold structure to strengthen the cartridge holding socket.

The manifold may be made from materials such as, but not limited to, plastic polymers, metals (e.g. steel, aluminum, copper, etc.), carbon fiber, and the like. Referring to FIGS. 1-3, the top-down view of the manifold base presents several inlets dispersed along the manifold. A more detailed operational description is provided below.

Inlet 2 allows raw water to flow from the water inlet to a first cartridge. The first outlet 3 allows water to flow from the first cartridge to the connection option 4, in which water may be taken to a proprietary component/accessory. Flow control valve 5 aperture receives a flow control valve that may optionally be opened/closed to allow/prohibit direct connection to a second cartridge through second inlet 6, respectively. When a flow control valve is closed, water will flow to connection option 4 instead of directly into the second cartridge through second inlet 6. With a flow control valve closed, a second inlet 7 provides an alternate connection option to the second cartridge for water to flow from an external component in lieu of the water flowing from the first cartridge. The benefit of providing these multiple flow paths is to allow for different accessories, components, and/or child parts to be used to conform to the proper water purification option without necessitating a physical change in the overall "as-built" layout of the purifier or manifold. In the exemplary embodiment, this design accommodates not only different types of filter cartridges, but also multiple raw water flow paths, which allows for filtration demarcation and specialized treatment for different raw water sources, quality, and hence purification needs. An additional reverse osmosis (hereinafter "RO") connector 8 is placed in the manifold specific to receiving an RO cartridge, which then distributes reject water from the RO cartridge via port 9.

The aforementioned flow paths of water between the first cartridge and second cartridge, including the flow control valves and connection options stemming from the valve location (collectively as the "flow path structure"), may be repeated along one singular manifold for each additional filter cartridge added to the manifold. For example, the manifold presented in the figures above provides capacity for four filter cartridges, and accordingly, for three of the aforementioned flow path structures in between these four cartridges. The number of cartridges and flow path structures may be increased or decreased dependent on end user demand.

The flow paths are preferably integral with the top surface of the manifold base structure, and are shown in the figures as raised structures creating channel flow for ingress and egress water. The bottom surface of the manifold base structure comprises mating structures/receptacles for receiving the filter cartridges.

Figure 3C:
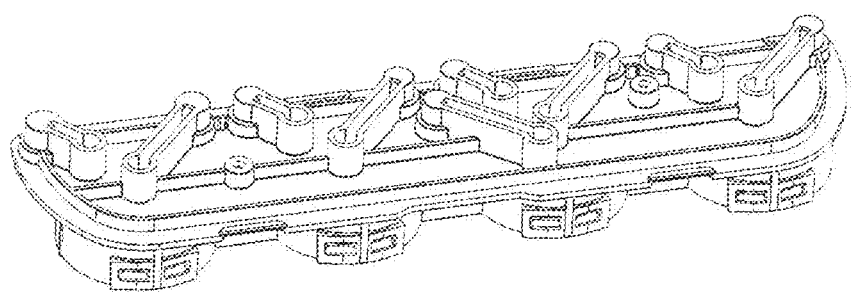
FIG. 3C depicts another illustration of a manifold where the flow path is different due to different water purification process/treatment/sequence of unit operations and there is a need to eliminate the use of valves in the manifold.

FIG. 3C depicts another illustration of a manifold where the flow path is different due to different water purification process/treatment/sequence of unit operations and there is a need to eliminate the use of valves in the manifold. Other configurations are not precluded by the depiction of the aforementioned illustrative examples.

Figure 4:
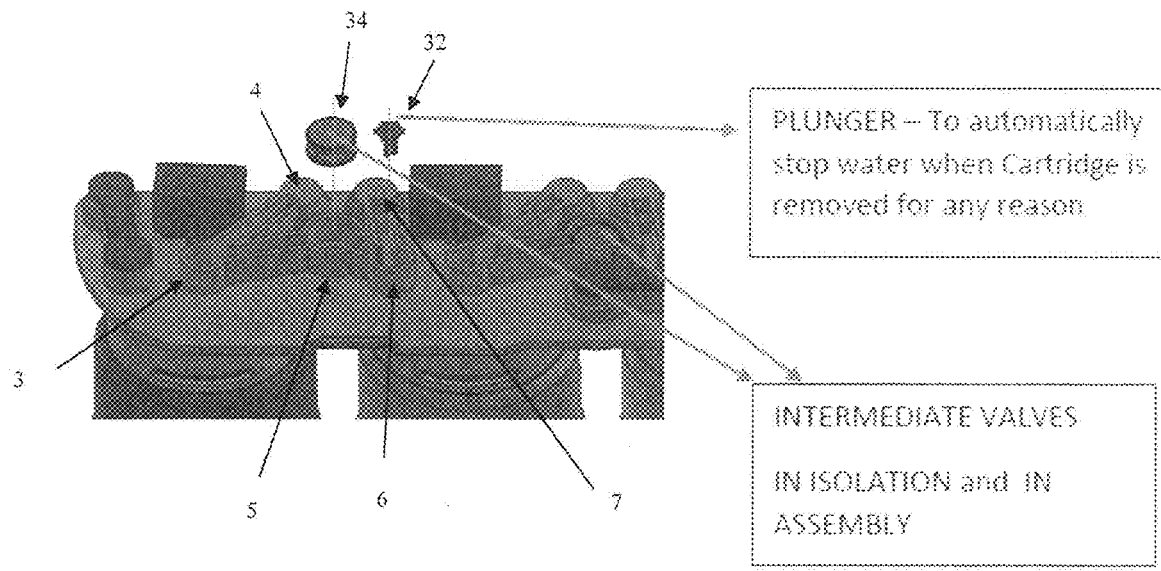
FIG. 4 depicts the top end of the manifold of FIGS. 1A-1B opposite the end where the cartridges connect.

FIG. 4 depicts the top end of the manifold of FIGS. 1A-1B opposite the end where the cartridges connect. This top end encompasses and houses the valves for redirecting water flow within at least one or all flow path structures. As an example, a plunger or dummy plug 32 is disposed within the flow path structure (shown here as second inlet 6) to halt the ongoing flow of water should the cartridge particular to that flow path structure be disconnected for any reason (i.e. breakage, accidental removal, etc.). Intermediate valve 34 is shown inserted within flow control valve aperture 5.

Figure 5:
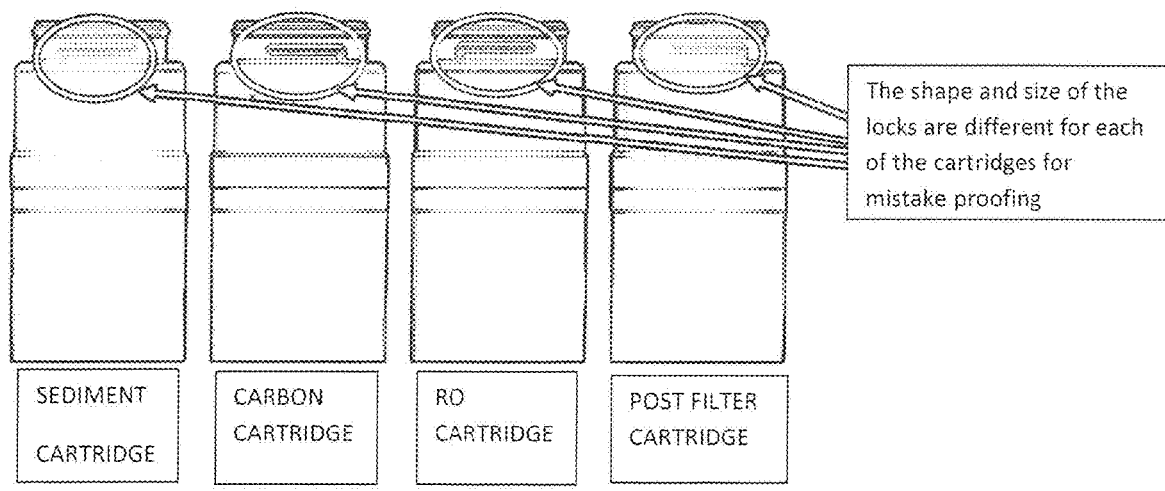
FIG. 5 depicts a marking/locking scheme for different filter cartridges, where the shape and sizes of the locking threads are different for each cartridge as a means for ensuring proper installation of the correct cartridge into the correct manifold connector.

FIG. 5 depicts a marking/locking scheme for different filter cartridges. As shown, the shape and sizes of the locking threads are different for each cartridge as a means for ensuring proper installation of the correct cartridge into the correct manifold connector. If a locking scheme is not used, color coding or cartridge labeling may be used instead. Shown in FIG. 5 are different filtration cartridges that may be typically used in a residential water purifier.

The aforementioned four-cartridge manifold embodiment of the present invention may utilize a plurality of cartridges, shown here as four main types of cartridges each performing a specific function, as demonstrated in FIG. 5. These cartridges (in order from left to right) are depicted as a sediment cartridge, a carbon cartridge, an RO (reverse osmosis) cartridge, and a post filter cartridge, although any type of order of cartridges may be realized depending upon user needs. These cartridges may be placed in a definite order along with accessories (further described below) to achieve the correct stages of filtration, amount of filter pressure, and purification levels of water. For a specific configuration of water filtration, swapping these cartridges into an improper order will result in improper purification, poor water taste, damage to the filter elements, and even complete stoppage of water flow, among other things.

To ensure these cartridges are installed in the correct order for a given configuration, each specific cartridge is disposed with an identifying locking structural limitation (as shown in FIG. 5) provided on the top peripheral edge of the cartridge that is inserted into the bottom surface mating structures/receptacles of the manifold meant for receiving the cartridges. These lock structures ensure that service providers install the cartridges in the correct order as required by the manifold layout, as each mating structure/receptacle has a complimentary structural limitation designed for reception of a particular filter cartridge. Attempts to insert the wrong cartridge into the wrong portion of the manifold will result in a failure of the cartridge to lock into place. However, this does not preclude the choice of using identical locking structures to keep the upfront investment in tooling low and to reduce difficulties for the end users. The cartridges may be differentiated in such cases by using color codes or other such simple devices. However, these may or may not be fool proof.

In one embodiment, depicted in FIGS. 6A-6C, the manifold 110 uses a rotatable shelf structure with hinges 112 on its back side (facing towards the water purification system) to assist with quick installation and removal of the filter cartridges. In the embodiment shown above, this shelf structure may be designed to swing out the entire manifold (and all accompanying filter cartridges) about the cartridges' longitudinal axis at once. FIG. 6A depicts the manifold with cartridges in a normal, operational position. FIG. 6B depicts the manifold with cartridges tilted on hinges 112 for removal and replacement. FIG. 6C depicts the hinges 112 on the rotatable manifold shelf structure.

In another embodiment, the rotatable shelves are disposed along each portion of the manifold meant for receiving a filter cartridge, thus allowing each individual filter cartridge to be independently swung out of the water purification system about the cartridges' longitudinal axis, allowing for easy replacement without disturbing the surrounding filter cartridges.

In yet another embodiment, the manifold is capable of utilizing erasable programmable read-only memory chip connectors 114 ("EPROM" connectors) as depicted in FIG. 7, which are connected to a Printed Circuit Board ("PCB") to retrieve and monitor data regarding each specific cartridge installed in the manifold. This data can be read by electronic water purification structures, as well as other processors, and the data is used to determine whether each section of the manifold received the correct specified cartridge, and how much useable life remains on that particular cartridge, among other things.

Figure 8A:
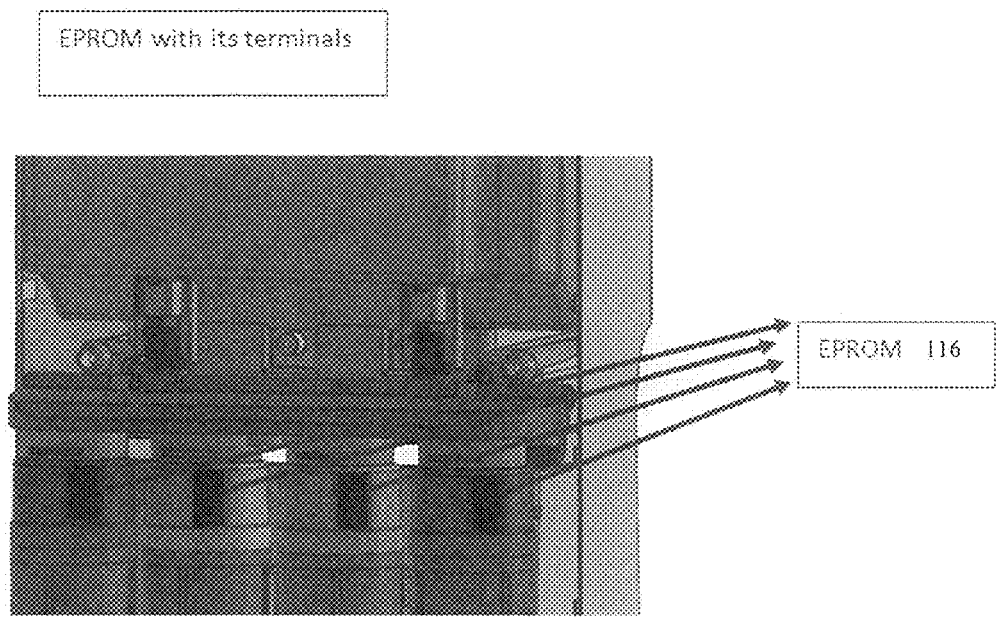
FIG. 8A depicts the EPROMs of FIG. 7 disposed on or within the top edge of each cartridge adjacent where the manifold and cartridge connects.

As depicted in FIG. 8A, the EPROMs 116 themselves are disposed on or within the top edge of each cartridge adjacent where the manifold and cartridge connects. Data is gathered in the EPROMs 116 by the electronic water purification system and transmitted to the relevant memory device reader/processor to determine correct placement and remaining useable life of each specific cartridge as previously discussed above.

Figure 8B:
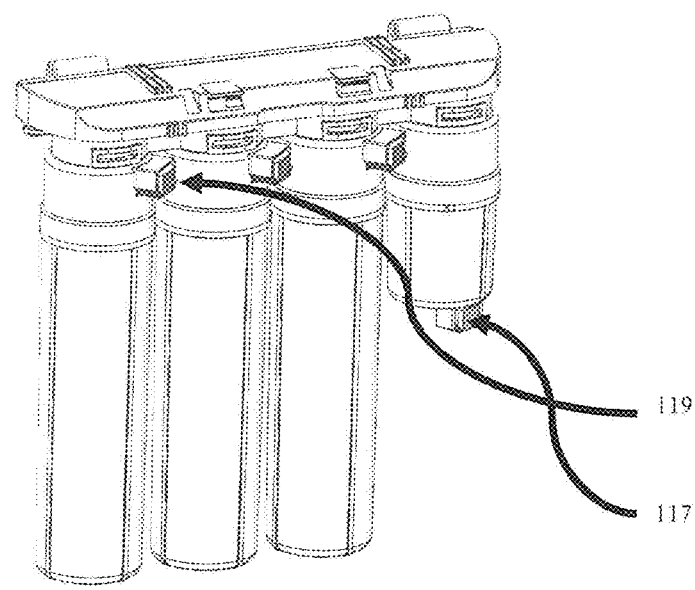
FIG. 8B depicts EPROM connectors placed in alternate locations on the cartridges, and connection to the PCB is made thru cables guided via grooves within the manifold cover.

Sometimes it is not possible due to technical and economical reasons to include the terminals of the EPROM connectors on either the manifold or the cartridges or both. Thus, an alternate device as shown in FIG. 8B is presented, where EPROM connectors 117, 119 are placed on the cartridges and connection to the PCB is made thru cables guided via grooves 121 within the manifold cover. FIG. 8B illustrates a case where all of the cartridges are not of the same size, and if the location of EPROM on all the cartridges is not the same due to layout restrictions. EPROM connectors or sockets are placed on the body of the cartridge at the side walls (117) or at the bottom of the cartridge (119).

Figure 9:
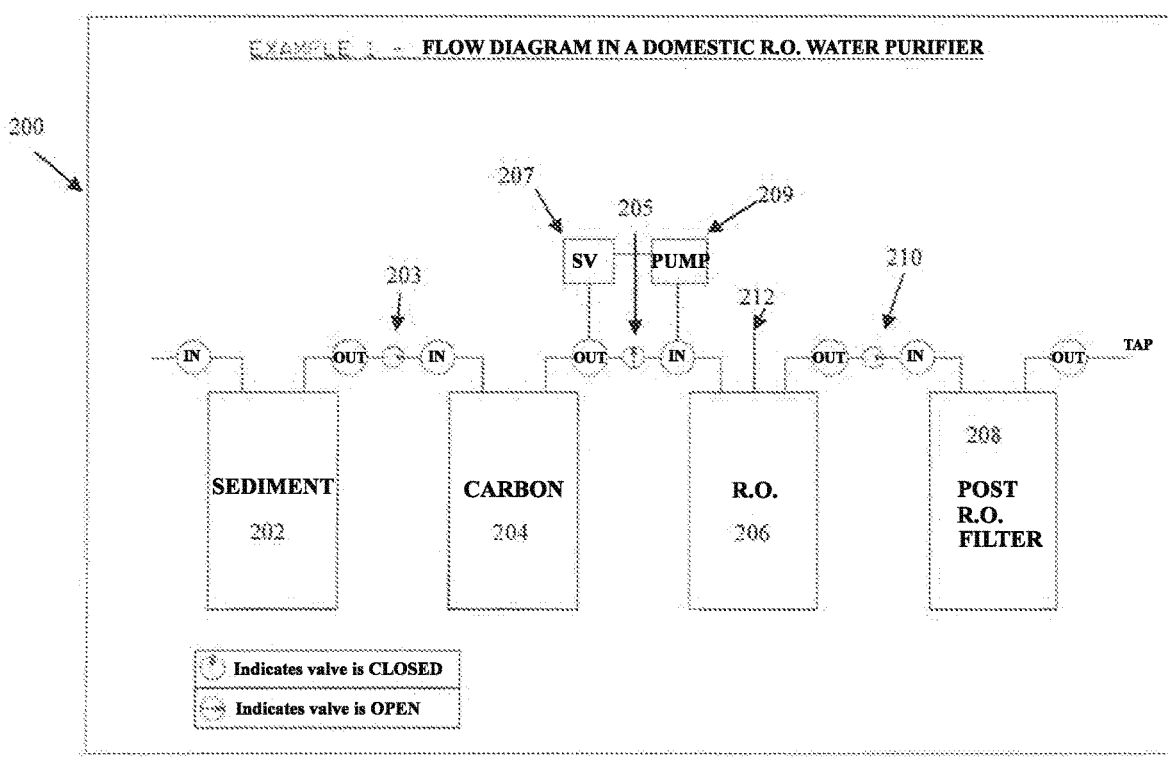
FIG. 9 provides one example of flow path in a water purifier system that can be created using a four-cartridge embodiment of the present invention.

FIG. 9 provides one example of flow path of a typical water purifier system 200 created using a four-cartridge embodiment of the present invention. In this first example, the flow path structure between a first sediment cartridge 202 and a carbon cartridge 204 allows a direct line (the first flow control valve 203 being open). In this example, the valve of the flow path structure 205 between the carbon cartridge 204 and an RO cartridge 206 is closed, thus redirecting water flow coming from the second outlet to a solenoid valve ("SV") 207 and pump structure 209, bypassing the direct line between the carbon cartridge and RO cartridge. The redirected flow of water enters into the RO cartridge 206 from pump 209, continuing into a fourth post-RO filter cartridge 208 via a direct line (the valve 210 in the third flow path structure being open). A reject line 212 is additionally provided for the flow path structure tied into the RO cartridge. Larger molecules unable to pass through the filter membrane in the RO cartridge get redirected through the reject line to avoid mixing with the purified water stream that otherwise passes through the flow path structure as normal.

Figure 10:
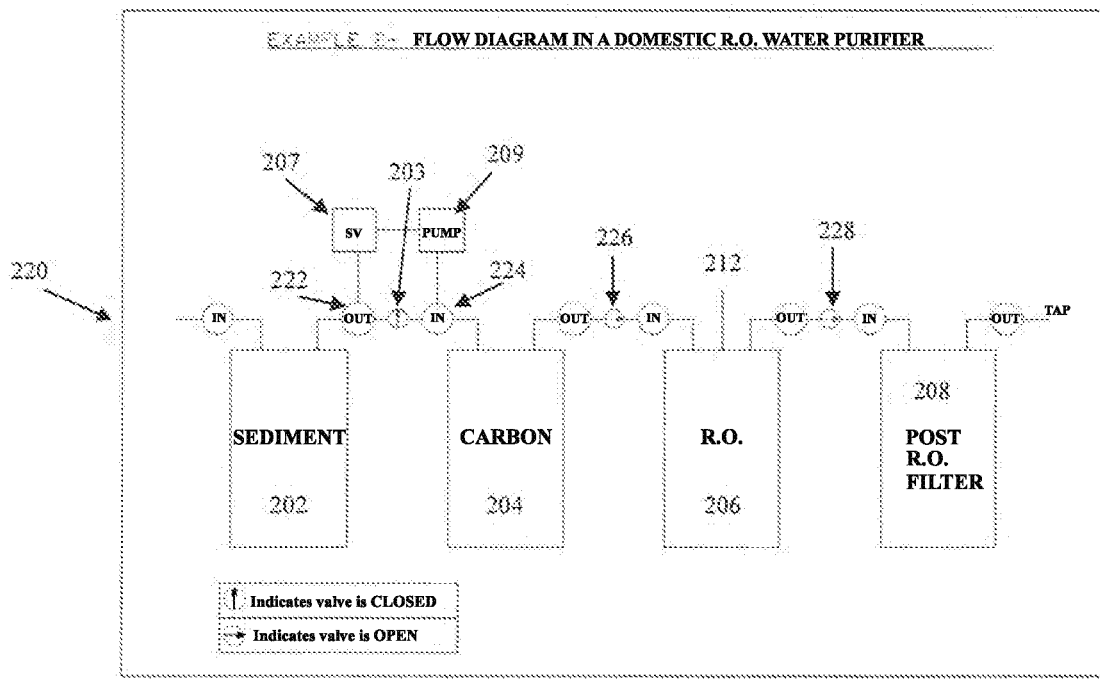
FIG. 10 provides an alternate example of a customized flow path using a four-cartridge embodiment of the present invention.

FIG. 10 provides an alternate example of a customized flow path 220 using the same four-cartridge embodiment of the present invention. In this example, the first valve 203 in the first flow path structure is closed, thus redirecting the flow of water from the first outlet 222 of the first cartridge 202 into the same solenoid valve 207 and pump 209 structure described in FIG. 9 above. The direct line between the first cartridge 202 and second cartridge 204 is bypassed, the flow of water instead re-entering the second cartridge 204 through the second inlet 224 via the pump 209. The remaining two flow path structures existing between the second, third, and fourth cartridges provide open valves 226, 228 and thus direct flow paths.

Once again, a reject line 212 is additionally provided for the flow path structure tied into the RO cartridge. Larger molecules unable to pass through the filter membrane in the RO cartridge get redirected through the reject line to avoid mixing with the purified water stream that otherwise passes through the flow path structure as normal.

Additionally, in the actual construction of the example illustrated in FIG. 10, it is possible to eliminate the use of valves used to choose or divert the flow so that the entire top manifold unit is constructed without the use of valves. This helps with ease of operation and use.

Figure 11:
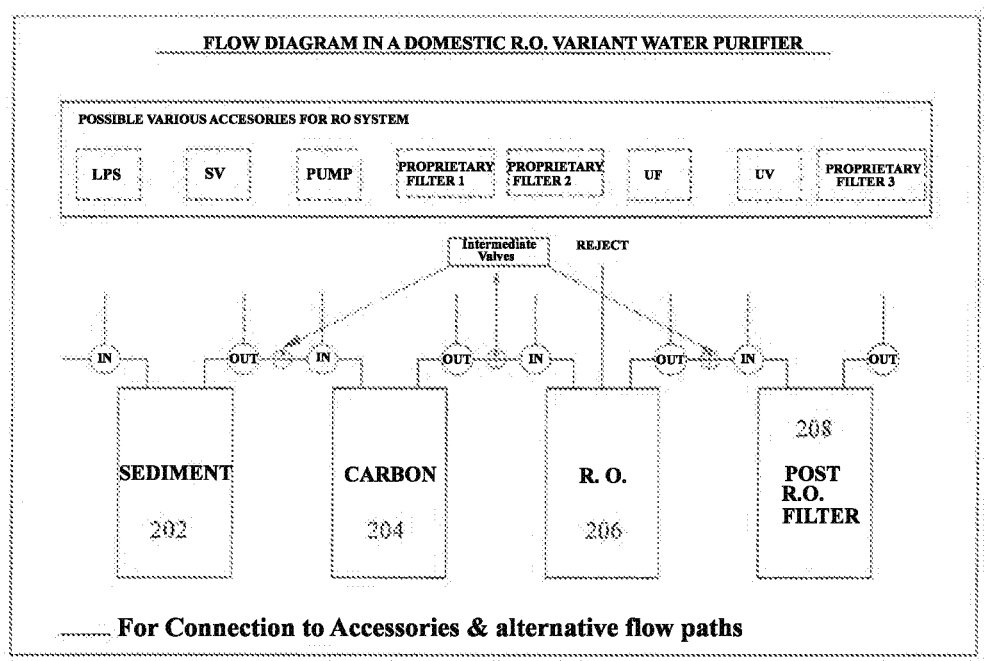
FIG. 11 provides yet another example of a customized flow path using the same four-cartridge embodiment of the illustrative examples.

FIG. 11 provides yet another example of a customized flow path using the same four-cartridge embodiment. In this particular example, all three direct flow paths between the four cartridges are eliminated via closed intermediate valves. The inlets and outlets of each flow path structure are instead available for connection to various accessories and proprietary components, including, but not limited to: low pressure switches ("LPS"), solenoid valves ("SV"), pump variations (e.g., diaphragm pumps or reverse osmosis pumps), proprietary filters, ultra-filtration structures ("UF"), and ultraviolet purifiers ("UV"). The accessories connected to each inlet/outlet existing in the flow path structures between each cartridge are chosen based on end user needs. If an accessory is not required for a particular flow path structure, then the connectors to the inlet/outlet will be closed off with a dummy plug and the intermediate valve will be opened to allow a direct flow into the subsequent cartridge. Any connections made to accessories may be done so using tubing, piping, or similar structures.

Figure 12:
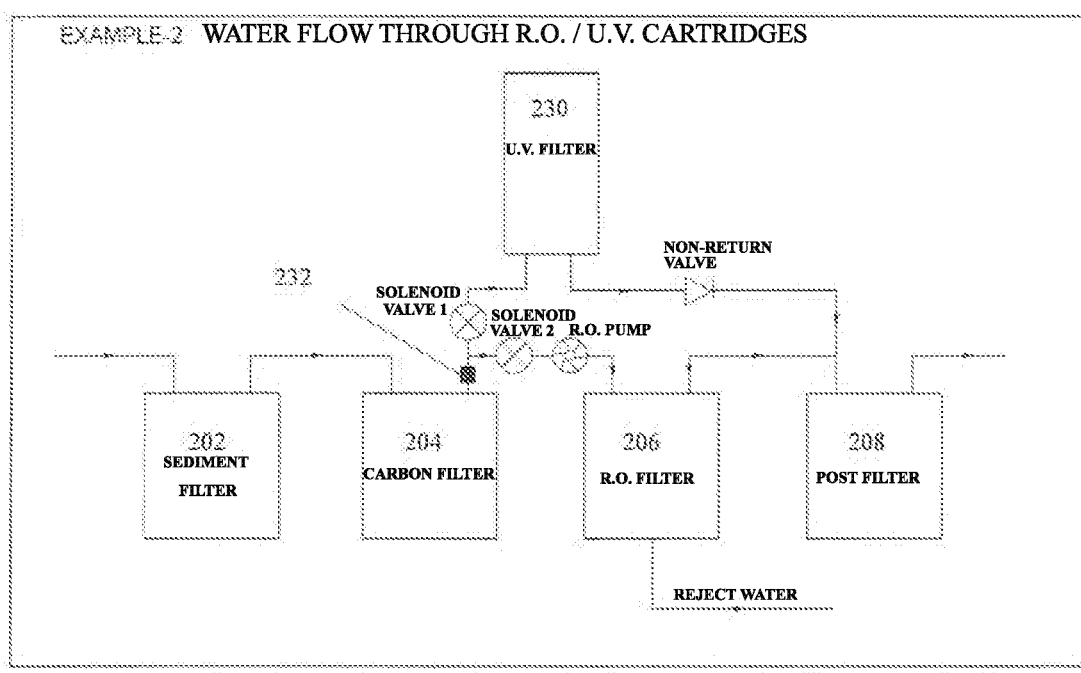
FIG. 12 depicts a specific type of water purification connection wherein an ultra-violet purifier has been placed in parallel to a reverse osmosis filter.

FIG. 12 depicts a specific type of water purification connection wherein a ultra-violet purifier 230 has been placed in parallel to a reverse osmosis filter 206. There is also a TDS (Total Dissolved Salts) sensor 232 which senses the IDS level of the incoming water. Depending on the levels of the TDS of the incoming water, the Solenoid Valve 1 or Solenoid Valve 2 is made to open. The TDS sensing levels are programmed in the Electronic Control Circuit. Depending on the programmed values of TDS, the water which is coming out from the Carbon Cartridge is made to enter either the UV or the RO Cartridge. This is made possible by the programmed electronic Circuit which will either open the Solenoid Valve 1 or Solenoid Valve 2 depending on the TDS levels sensed by the TDS sensor.

Figure 13:
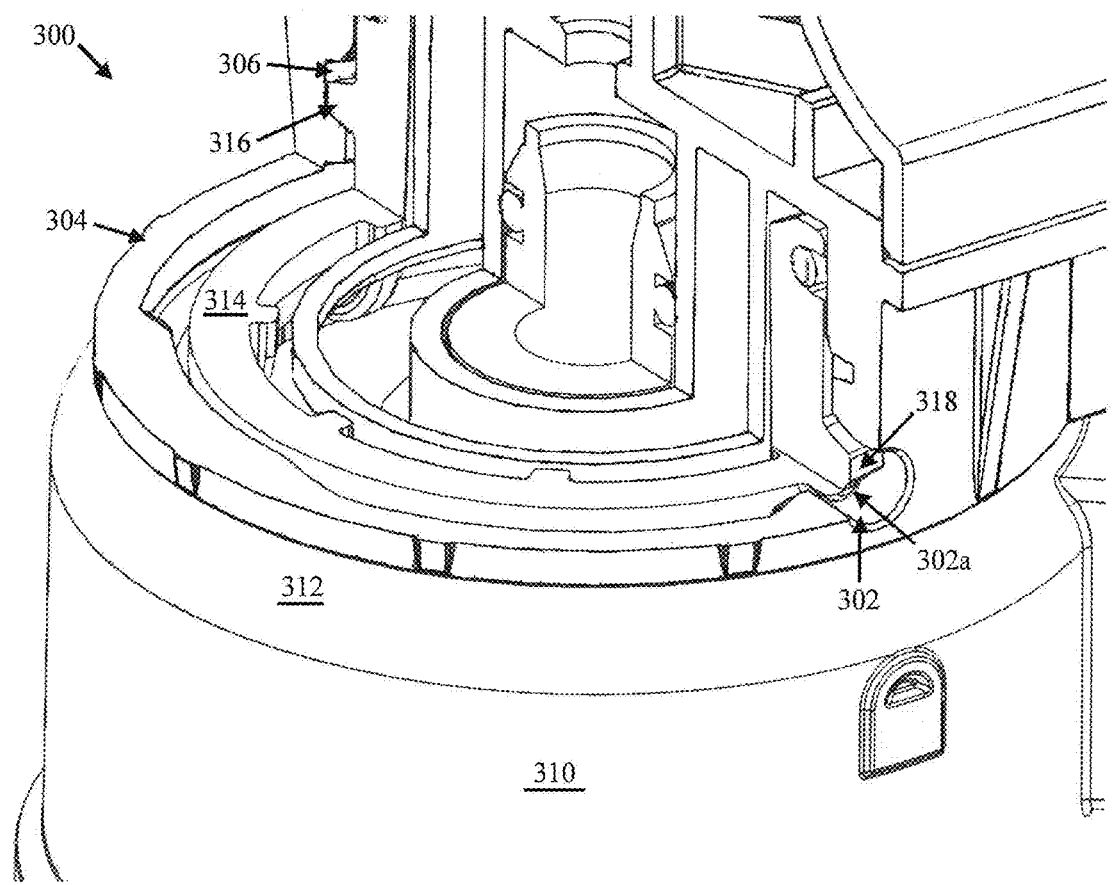
FIG. 13 is a partial cross-sectional view of an embodiment of a manifold and installed filter cartridge of the present invention.
Figure 14:
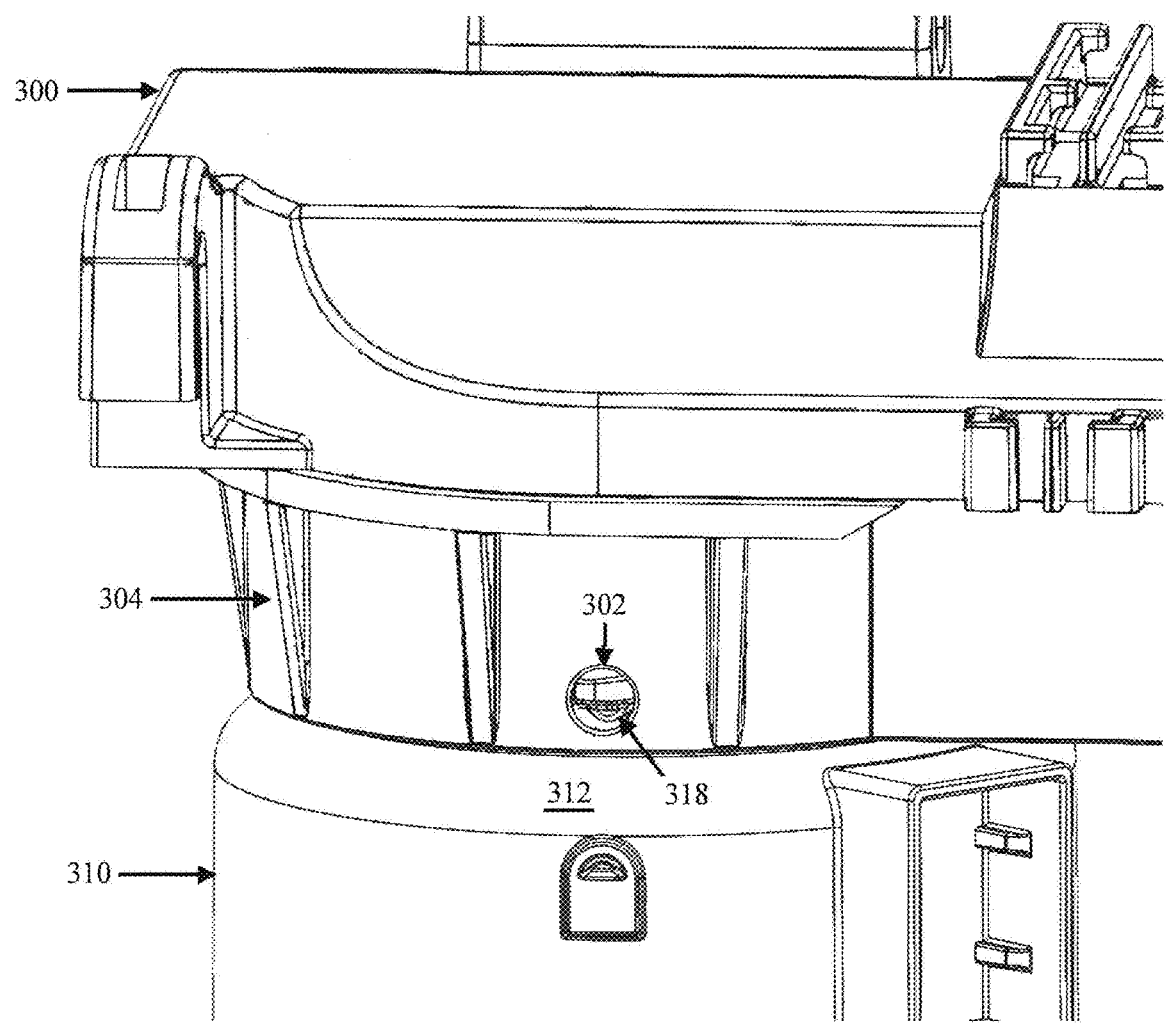
FIG. 14 is a partial front elevational view of the manifold and filter cartridge of FIG. 13.

FIGS. 13-14 depict an embodiment of a manifold 300 and cartridge 310 structure of the present invention which may be applicable across all cartridge types 202, 204, 206, and 208. Cartridge 310 includes a top portion 312 having a threaded, cylindrical structure 314 extending vertically therefrom and partially housing an ingress/egress port to be received in a manifold receptacle 304 located on a bottom surface of the manifold. The cartridge threaded, cylindrical structure 314 includes a radially, outwardly extending helical threaded portion or helical thread 316, and may vary in design to ensure an end user inserts the correct cartridge in the correct receptacle 304 of the manifold 300, as described in previous embodiments. Variations in design may include variable thicknesses, lengths, or pitches of thread 316. The cartridge threaded, cylindrical structure 314 may also include variable diameters. The threaded, cylindrical structure 314 generally presents thread 316 (which may alternatively be multiple threads) that wraps around at least a portion of the outward, peripheral face of the threaded, cylindrical structure 314.

Figure 15:
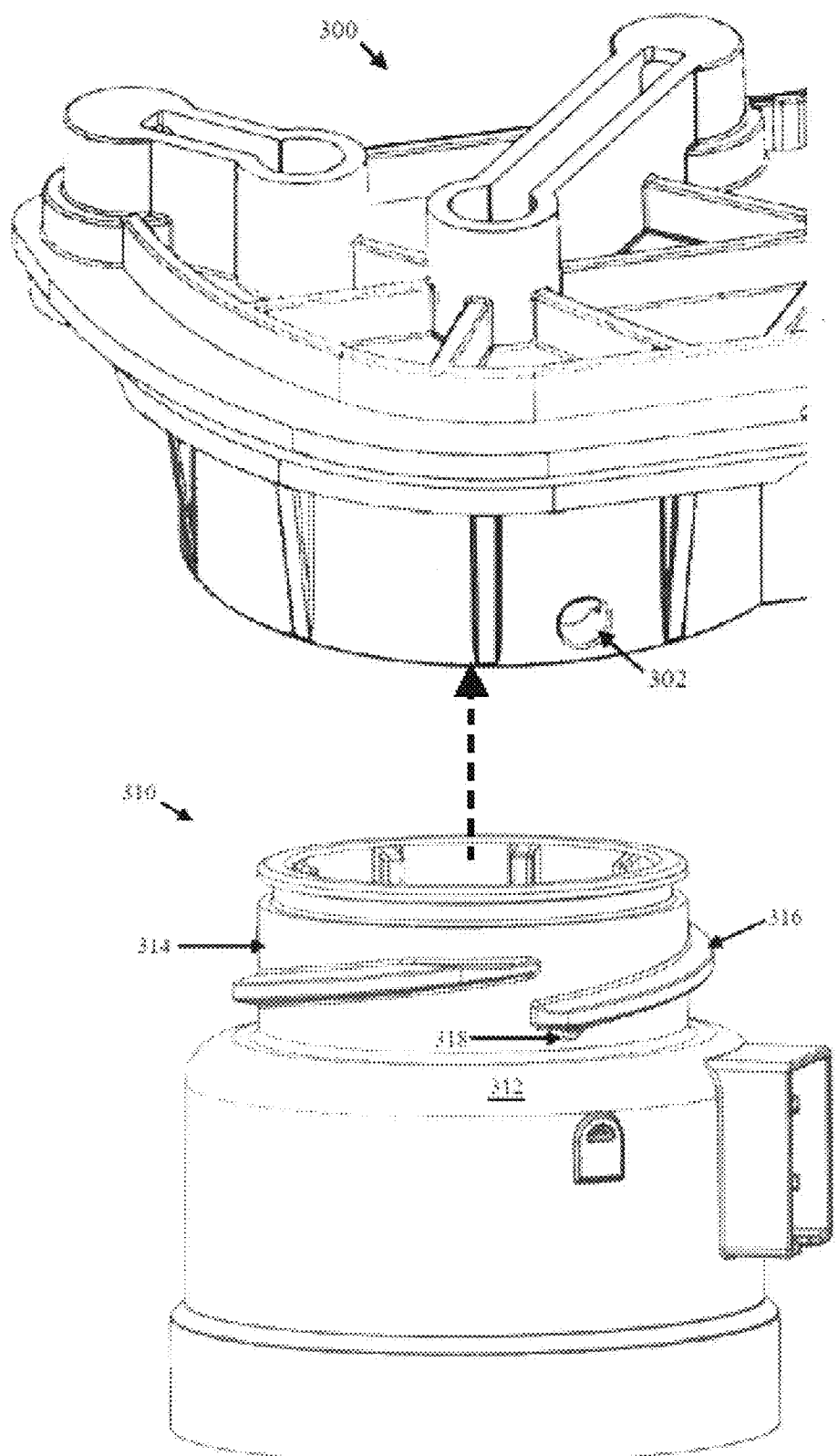
FIG. 15 is an exploded perspective front elevational view of the top portion of the filter cartridge and associated receptacle of the manifold of FIG. 13.

While thread 316 of cartridge 310 shown in FIG. 15 is shown to wrap around the threaded, cylindrical structure 314 exactly once to allow for a 360° rotational interaction with the manifold receptacle 304, thread 316 may instead have alternative lengths to increase or decrease the degree of rotation necessary to complete the process of securing the cartridge to the manifold. As such, the threaded, locking structure may present a thread that requires a rotational range from about a quarter-rotation (about 90°) or less, all the way up to a fully threaded connection that may require several full rotations (e.g., 360° or fractional multiples thereof) to achieve full insertion and secure connection to the manifold.

Thread 316 includes a protrusion 318, shown located for exemplary purposes on the bottom of thread 316 at one terminating end, which assists in securing the cartridge 310 into the manifold against reverse-turning or unwanted release once it is fully installed. Manifold receptacle 304 has a complementary, helical locking thread 306 for receiving the thread 316 of cartridge 310 to be installed. At the end of the complementary locking thread 306 is a receiving indent or aperture 302 for receiving protrusion 318 of the cartridge thread 316 once the inserted cartridge 310 is at the end of its rotation. Protrusion 318 is inserted within indent or aperture 302 and provides a more secure connection between the manifold and the cartridge. This allows fluid to flow through the system at higher pressure levels, due in part because cartridge 310 will be less likely to reverse-rotate under a high pressure condition.

Figure 16:
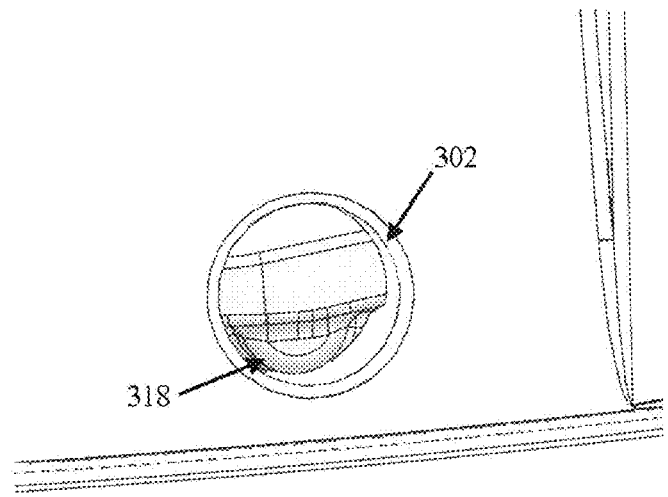
FIG. 16 is a close up perspective view of the locking connection between the manifold groove and cartridge protrusion of FIG. 13.
Figure 17:
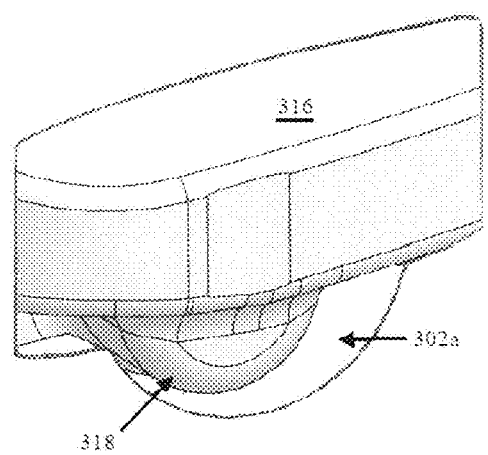
FIG. 17 is a close up, partial cross-sectional view of the groove and protrusion of FIG. 16 which displays the semi-circular cut in which the protrusion is received.

Indent or aperture 302 is formed having in cross-section a semicircular cut 302a extending radially inwards from a portion of the cut's perimeter as shown in FIGS. 16-17. In the exemplary embodiment, protrusion 318 is formed as a semicircular bump that is complementary to the receiving semicircular cut 302a. When an end user inserts and rotates the cartridge 310 into the manifold 300, the protrusion 318 will snap or click into place within the indent or aperture 302 and semi-circular cut 302a at the end of the cartridge's rotational travel, due to resiliency in the complementary locking thread 306 and cartridge thread 316. This snapping or clicking indicates the cartridge being fully rotated in and secured.

In alternative embodiments, the manifold's indent or aperture 302 may instead be an extending nub, and the cartridge's protrusion 318 may instead be a detest for receiving the nub at the end of the cartridge's rotation. Although the semicircular cut 302a and complementary protrusion 318 are both shown as semicircular configurations in FIG. 17, they may alternatively be formed in other complementary protruding shapes and receiving indents or apertures capable of achieving a similar "snap-in" feature, and thus should not be interpreted as being limited to the configurations shown herein.

While the locking interaction between receptacle 304 and cartridge threaded, locking structure 314 represents a novel improvement towards achieving greater pressure tolerances, the remaining structures and functions remain the same across all embodiments. The valve and flow path structures on the top surface of manifold 300 and their functions are similar to those presented in the manifold embodiments presented in FIGS. 1-4 and described herein. The manifold also utilizes a hinged shelf connection to its base structure to allow for manifold 300 to rotate or swing about the cartridges' longitudinal axis, which allows for easier end user access to the cartridges. Each cartridge may further have EPROMs 116 disposed on or within each cartridge to interact with the memory device reader 114 installed on or within the manifold. The data provided by the EPROMs of each cartridge to the memory device reader may be used to determine correct placement and remaining useable life of each cartridge, as presented in the previous manifold and cartridge embodiments.

Similar to the previously disclosed embodiments, the manifold 300 of the present invention includes a plurality of receptacles 304 for receiving a plurality of cartridges 310. Each receptacle 304 may present their own unique receptacle complementary lock threading 306 that is structurally different from the next receptacle complementary lock threading. Each cartridge 310 will have their threading 316 structured to these unique receptacle complementary thread designs, which will prevent an end user from inserting a filter cartridge into the wrong receptacle of the manifold, as previously described and exemplified in FIGS. 9-12.

The present invention provides one or more of the following advantages: 1) a manifold capable of being rotatable about its longitudinal axis for removal from its structure to allow for convenient insertion and removal of replacement parts; 2) a manifold that allows for multiple flow paths of raw water in the water purification device so that different accessories, components, and/or child parts may be used to achieve the proper water purification option without necessitating any change in the overall layout of the original purification structure or manifold; 3) a manifold that can hold several cartridges at a time with a built-in design feature that allows for only one type of cartridge to be properly inserted into a specific assigned location on the manifold; 4) a manifold designed to permit terminals of an embedded electronic component on a filter cartridge to mate with corresponding terminals in the manifold itself, the manifold terminals permitting the relative device to electronically identify and verify the suitability of an inserted filter cartridge; and/or 5) a manifold and cartridge locking structure that allows for fluid to flow therethrough at higher-than-normal pressures.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A water purification system, comprising:
   a manifold having a top surface and a bottom surface, the bottom surface having receptacles for receiving at least one filter cartridge;
   at least one flow path structure disposed on said top surface of the manifold forming at least one channel for water to flow to and from the at least one filter cartridge, the at least one flow path structure having at least one inlet for water ingress and one outlet for water egress, and at least one channel formation, and
   at least one valve for allowing or prohibiting a direct flow of water received in the at least one channel formation of the at east one flow path structure on said top surface of the manifold;
   wherein opening of the at least one valve allows for a direct flow of water via the at least one flow path structure to the at least one filter cartridge, and wherein closing of the at least one valve prohibits a direct flow of water and can further redirect the flow of water from the at least one flow path structure to components other than said at least one filter cartridge.

2. The water purification system of claim 1 wherein a plurality of flow path structures are disposed on said top surface of the manifold and a plurality of valves are received in a plurality of channel formations of the plurality of flow path structures, each of the plurality of flow path structures are connected to a pair of filter cartridges, and wherein each flow path structure valve can be opened to allow for a direct flow of water between the pair of filter cartridges via the flow path structure, or closed to prohibit a direct flow of water between the pair of cartridges, and to further redirect the flow of water to components other than said pair of filter cartridges.

3. A water purification system, comprising:
  a manifold having a top surface and a bottom surface, the top surface having at least one flow path structure disposed thereon, the at least one flow path structure having at least one channel formation, the bottom surface having a receptacle for receiving a filter cartridge, the receptacle having a complementary helical locking thread extending radially thereon, the complementary helical locking thread further having an indentation or aperture;
  at least one valve for allowing or prohibiting a direct flow of water received in the at least one channel formation of the at least one flow path structure on said top surface of the manifold, wherein closing of the at least one valve can further redirect the flow of water from the at least one flow path structure to components other than said at least one filter cartridge; and
  the filter cartridge having a threaded, cylindrical structure with a helical thread for mating with the complementary helical locking thread of the receptacle, the cartridge helical thread having a protrusion disposed thereon for reception by the indentation or aperture of the receptacle complementary helical locking thread.

4. The water purification system of claim 3 comprising a plurality of receptacles on the manifold, wherein each of the plurality of receptacles has a complementary helical locking thread.

5. The water purification system of claim 4 wherein the complementary helical locking threads of each of the plurality of receptacles are unique or structurally different from each other.

6. The water purification system of claim 5 further comprising a plurality of filter cartridges, each of the plurality of filter cartridges having threaded, cylindrical structures with helical threads for mating with the complementary helical locking threads of each of the plurality of receptacles.

7. The water purification system of claim 3 wherein the helical thread of the filter cartridge has a length that requires about a quarter-turn (about 90°) of the filter cartridge once the threaded, cylindrical structure of the cartridge is inserted into the manifold receptacle to lock the filter cartridge in place via connection between the indentation or aperture of the receptacle complementary helical locking thread and protrusion of the cartridge helical thread.

8. The water purification system of claim 3 wherein the at least one flow path structure forms a channel for water to flow to and from the filter cartridge.

9. The water purification system of claim 8 comprising a plurality of receptacles on the manifold for receiving a plurality of filter cartridges, and a plurality of flow path structures disposed on the top surface of the manifold, the plurality of flow path structures forming a plurality of channels for water to flow to and from the plurality of filter cartridges.

10. The water purification system of claim 3 wherein the indentation or aperture of the complementary helical locking thread is formed in a semi-circular cut.

11. A method of assembling a water purification system, comprising:
  providing a manifold having a top surface and a bottom surface, the top surface having at least one flow path structure disposed thereon, the at least one flow path structure having a channel formation for receiving a valve for allowing or prohibiting a direct flow of water, the bottom surface having at least one receptacle for receiving at least one filter cartridge, the at least one receptacle having a complementary helical locking thread, the complementary helical locking thread having an indentation or aperture disposed thereon, the at least one filter cartridge having a helical thread for mating with the complementary helical locking thread of the at least one receptacle of the manifold, the helical thread further having a protrusion disposed thereon for locking reception by the manifold;
  inserting the at least one filter cartridge into the at least one receptacle of the manifold;
  rotating the at least one filter cartridge within the at least one receptacle such that the helical thread of the at least one filter cartridge traverses through the complementary helical locking thread of the at least one receptacle;
  snapping the protrusion of the cartridge helical thread into the indentation or aperture of the receptacle complementary helical locking thread;
  locking the at least one filter cartridge into the manifold;
  if allowing a direct flow of water, opening the valve in the at least one flow path structure channel formation; and
  if redirecting the flow of water to components other than said at least one filter cartridge, closing the valve in the at least one flow path structure channel formation.

12. The method of claim 11 further including a plurality of receptacles and a plurality of filter cartridges, wherein each of the plurality of filter cartridges has a unique helical thread, and each of the plurality of receptacles has a complementary helical locking thread, such that only one of the plurality of filter cartridges may be properly locked into only one of the plurality of receptacles.

13. The method of claim 11 further providing an EPROM mounted on or within the at least one filter cartridge, and a memory device reader mounted on or within the manifold.

14. The method of claim 13 further including the steps of identifying the at least one filter cartridge through interaction of the EPROM with the manifold memory device reader, and transmitting information, by the manifold memory device reader, relative to a useable life and proper/improper installation of the at least one filter cartridge.

15. The method of claim 11 wherein the indentation or aperture of the complementary helical locking thread is formed as a semi-circular cut.

16. The method of claim 11 further including a threaded, cylindrical structure extending from the at least one filter cartridge, the threaded, cylindrical structure having the helical thread disposed thereon.

17. The method of claim 11 wherein the helical thread of the at least one cartridge has an indentation or aperture disposed thereon, and the complementary helical locking thread of the at least one receptacle has a protrusion disposed thereon.

18. A water purification system, comprising:
  a manifold having a top surface and a bottom surface, the top surface having a plurality of flow path structures disposed thereon, the plurality of flow path structures having channel formations, the manifold bottom surface having receptacles for receiving a plurality of filter cartridges, the receptacles having complementary helical locking threads extending radially thereon, the complementary helical locking threads further having indentations or apertures;

a plurality of valves for allowing or prohibiting a direct flow of water between the plurality of filter cartridges received in the plurality of flow path structure channel formations on said top surface of the manifold, wherein closing of at least one of said plurality of valves can further redirect the flow of water from the plurality of flow path structures to components other than said plurality of filter cartridges; and the plurality of filter cartridges each having a threaded, cylindrical structure with a helical thread for mating with the complementary helical locking threads of the receptacles, the cartridge helical threads having protrusions disposed thereon for reception by the indentations or apertures of the receptacle complementary helical locking threads.

19. The method of claim 16 wherein a rotational range of the at least one filter cartridge is about a quarter-turn (about 90°) to lock the filter cartridge in place once the threaded, cylindrical structure of the cartridge is inserted into the manifold receptacle.

20. The method of claim 16 wherein a rotational range of the at least one filter cartridge is between about a quarter-turn (about 90°) to a full rotation (about 360°) to lock the filter cartridge in place once the threaded, cylindrical structure of the cartridge is inserted into the manifold receptacle.

21. The method of claim 16 wherein a rotational range of the at least one filter cartridge is greater than a full rotation (over 360°) to lock the filter cartridge in place once the threaded, cylindrical structure of the cartridge is inserted into the manifold receptacle.

* * * * *

UNITED STATES PATENT AND TRADEMARK OFFICE
CERTIFICATE OF CORRECTION

PATENT NO. : 11,078,090 B2
APPLICATION NO. : 16/804166
DATED : August 3, 2021
INVENTOR(S) : Singh et al.

Page 1 of 1

It is certified that error appears in the above-identified patent and that said Letters Patent is hereby corrected as shown below:

In the Specification

In Column 10, Line 38, delete "the IDS level" and substitute therefor -- "the TDS level" --

In Column 11, Line 45, delete "a detest for" and substitute therefor -- "a detent for" --

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*